July 1, 1947.  K. M. HAMILTON  2,423,313
RAILROAD CAR TRUCK
Filed May 15, 1944  3 Sheets-Sheet 3
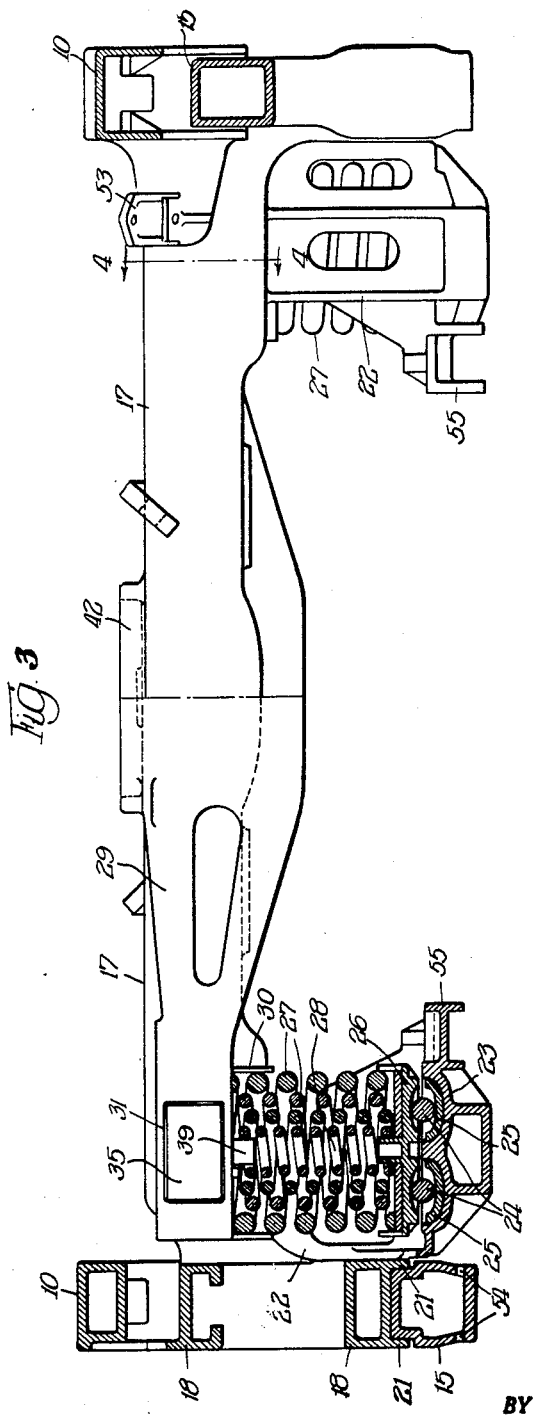
INVENTOR.
Karl M. Hamilton,
BY George Heideman
atty Patented July 1, 1947

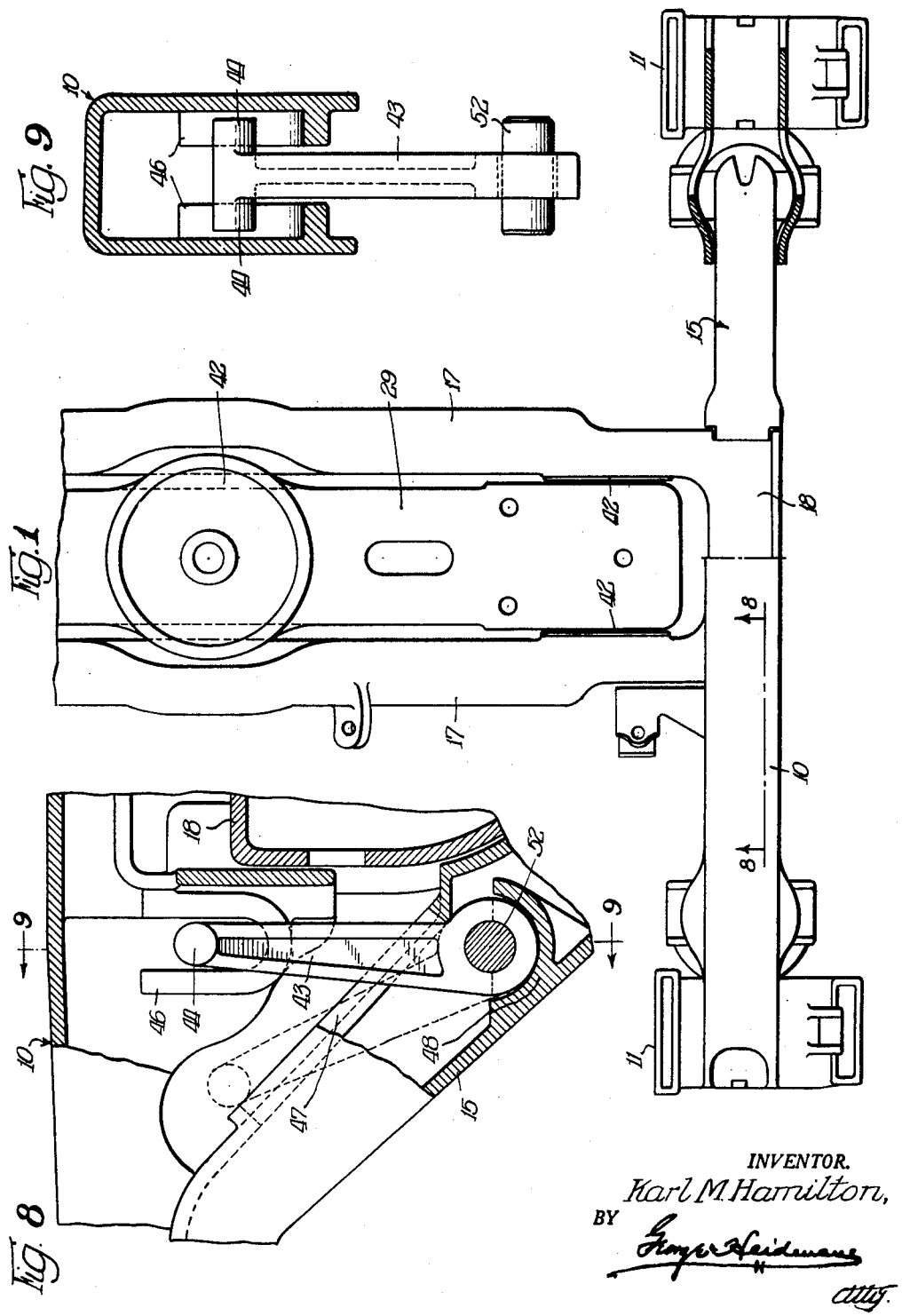

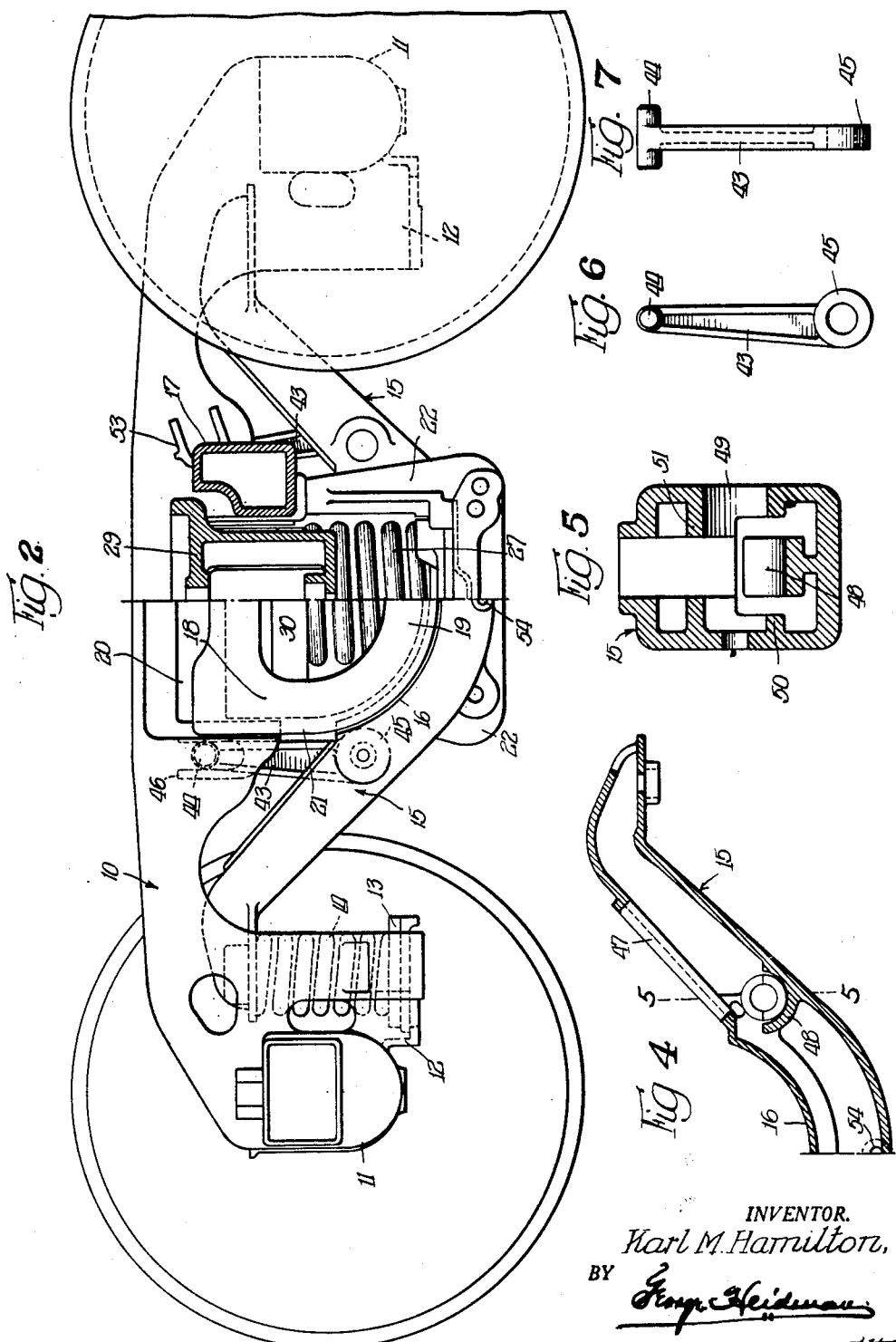

2,423,313

UNITED STATES PATENT OFFICE 2,423,313

RAILROAD CAR TRUCK

Karl M. Hamilton, Chicago, Ill.

Application May 15, 1944, Serial No. 535,698

16 Claims. (Cl. 105—186)

My invention relates to a railroad car truck designed for high speed and at the same time smooth and easy operation and principally constructed of cast steel members formed to permit easy assembly without rivets or bolts; a truck initially of moderate cost and at the same time of extremely low maintenance upkeep; with each truck involving a pair of side frames with integral journal boxes and spring brackets—a pair of equalizers—an equalizer supported transom—and a spring supported truck bolster.

The spring brackets of the side frames are provided with floor or seat members for supporting suitable spring assemblies which carry the equalizer members which, in turn, support the transom members of the truck.

The invention has for its object the provision of equalizer members whose ends are adapted to seat on the spring assemblies to permit free relative movement between the side frames and the equalizer members, while the intermediate portions of the equalizer members are formed to provide dished seats for the ends of the transom members which permit longitudinal rocking of the equalizer members while maintaining the vertical position of the transom members, which are formed to have interengaging relation with the equalizer members and with the column portions of the side frames to prevent relative in and out lateral movement between the frames and the equalizer members while permitting relative vertical movement between the side frames and the transom members.

Another object of the invention is the provision of a transom construction provided with roller and spring mechanisms for yieldingly supporting the ends of the truck bolster and whereby lateral movement of the bolster is permitted and easy, smooth riding of the truck body afforded.

The foregoing objects and advantages of my invention, as well as other advantages inherent in the invention, will all be readily comprehended from the detailed description of the accompanying drawings, wherein—

Figure 1 is a top plan view of one half or side of my improved truck with one end of the side frame having a portion broken away and a portion in section.

Figure 2 is a side elevation of one half of the truck, while the other half is in sectional elevation with the journal box end of the side frame, the immediate end of the equalizer and a portion of the truck wheel shown in dotted lines.

Figure 3 is a transverse sectional view of the truck, with the left hand end of the transom extension and bracket and the equalizer and side frame shown in vertical section; while the right hand end of the figure shows the transom and bracket in elevation and a portion of the side frame and equalizer in section.

Figure 4 is a vertical longitudinal section of one half of an equalizer.

Figure 5 is a cross sectional view taken on the line 5—5 of Figure 4.

Figure 6 is a side elevation of one of the equalizer hangers.

Figure 7 is an edge view of the same.

Figure 8 is a vertical section taken substantially on the line 8—8 of Figure 1.

Figure 9 is a vertical section taken substantially on the line 9—9 of Figure 8.

The exemplification of my improved truck, as disclosed in the drawings, involves a pair of side frames (which are identical and only one being shown) each consisting of a single piece member 10, with the journal boxes 11 cast integral therewith. Cast integral with the ends of the side frame adjacent each journal box and extending in an inward direction from the latter, namely toward the transverse median line of the truck, is a bracket 12, provided with a horizontally disposed floor or seat 13 (which may consist of a separate piece or be cast integral with the bracket) on which the equalizer spring, or springs, 14 are mounted (see Figure 2).

The springs 14, adjacent the ends of the side frames 10, support the ends of the equalizer 15; the ends of the equalizer being suitably formed to effect non-slipping engagement with the upper ends of the springs.

The equalizer 15 (a similar equalizer being employed on both sides of the truck) is preferably a one piece cast steel structure which bows downwardly intermediate its ends to provide a concaved or substantially semi-circular seat portion 16 to receive and provide a seat for the united ends of the transom members 17, 17 about which the equalizers rock or fulcrum.

The transom members 17, 17 are made of cast steel, preferably in one piece, extending from equalizer to equalizer at opposite sides of the truck and the ends of the two members united at their tops by a hollow box-like structure 18 whose bottom is of semi-circular contour at 19 to seat on the substantially semi-circular seat portion 16 of each equalizer 15, see Figure 2; the transom ends 18 extending into the window opening 20 of each side frame 10. The united ends 18 of the transom members are each provided with the longitudinally spaced extensions or flanges 21, 21 (see Figures 2 and 3) with the outer flange 21 overlapping the outer face of the equalizer seat portion 16 and the window surrounding column portion of the side frame 10, while the inner flange 21 overlaps the inner face of the equalizer seat portion 16 and the column portion of the side frame, see Figure 3, thereby locking the two equalizers together and anchoring the transom ends to the side frames against improper movement of the transom members transversely of the truck. That is to say, the transom members are non-shiftingly anchored to the equalizers and to the side frames at opposite sides of the truck so as to prevent improper outward or inward movement of either side frame or equalizers; while on the other hand permitting relative vertical movement between the transom members and the side frames.

The transom members adjacent their united ends and inwardly of the equalizers are provided with depending extensions or brackets 22 whose lower ends extend horizontally inward and are formed to provide concaved seats as shown at 23 (see Figure 3) to receive suitable antifriction bearings or rollers 24, arranged transversely of the bracket-seats; the concavities being preferably provided with hardened liners 25.

Mounted on the rollers 24 are suitable cap members 26 whose lower faces are concaved to receive the rollers while the upper faces are formed to provide seats for the plurality or group of concentric coil springs 27 and the innermost spring 28.

The springs 27, at opposite sides of the truck, support the ends of the truck bolster 29, which is arranged between the transom members 17, 17, with its ends terminating short of the united outer end portions of the transom members, as shown in Figure 1. The lower face of the bolster at each end is provided with the depending cup-like portion 30 for receiving the upper ends of the springs 27 and to maintain the latter in proper seating and bearing relation with the truck bolster 29.

As is apparent from the construction shown, the spring and antifriction or roller mounting of the truck bolster on the transom depending bracket extensions will permit a predetermined degree of relative lateral movement between the transom and the truck bolster and thus relieve the car carrying or truck bolster of the side slaps or lateral thrusts encountered by the truck wheels and hence affords a smoother and easier riding car.

As is apparent from Figures 8 and 9, the side frames 10, adjacent their ends, may be of inverted channel formation to receive the upper ends of the equalizers and permit relative vertical movement between the side frames and equalizers, which latter are made to fulcrum about the extensions of the transom members.

With the equalizer supporting springs located to the exterior of the journal boxes on the inwardly disposed brackets 12, longer and heavier springs having greater carrying capacity may be employed. This same condition also is true with the bolster supporting springs 27, carried by the brackets or extensions 22 of the transom members, as these springs are not confined to the limitations of the window openings in the side frames (the use of the usual spring plank being eliminated) while at the same time maintaining the required clearances between the bottom of the truck and the top of the rails.

In order to prevent the equalizers 15 dropping down in the event of failure or breakage of the supporting springs 14, I prefer to pendantly support the equalizers from the side frames in a manner which will not interfere with the free oscillatory or rocking movements of the equalizers about the transom and extensions 18. In Figure 2 I exemplify the method which consists in employing a pair of safety hangers or links 43, 43 for each equalizer at opposite sides of the transom-extension receiving openings in the side frames. The hangers or links 43 preferably are of the construction shown in Figures 6 and 7, with one end (which constitutes the upper end) provided with the laterally disposed cylindrical head or trunnion forming portions 44, 44, while the other end 45 is enlarged and apertured. The side frames are of inverted U-shape cross-section, as shown in Figure 9 and each side on the interior provided with an open top socket forming bracket or U-shape rib 46, in opposing spaced relation to freely receive the link 43 therebetween, while the trunnions 44 ride freely in the sockets formed by ribs 46, 46 and may pendantly support the links in place. The tops of ribs 46 are arranged a suitable distance below the tops of the side frames to enable the trunnions 44, 44 to freely pass over the tops of the ribs in assembling the truck.

The equalizers 15 are of hollow box-like construction in cross-section with elongated openings in the top wall of the upwardly disposed ends, as shown at 47, for passage of the hangers or links 43. These openings terminate adjacent the transom receiving seat portion 16, where the equalizers are somewhat enlarged transversely and internally provided on its bottom wall with the upstanding semi-circular rib 48 (see Figure 8) and an opening 49 in one of the side walls of the equalizer; while the side walls of the equalizer, above and below the openings 49, are provided with the opposingly disposed, substantially semi-circular ribs 50 and 51; these ribs being spaced laterally apart to freely receive the lower ends 45 of the links 43 therebetween. A suitable pin 52 is inserted through the hole 49 and through the apertured end 45 of the link 43, with the ends of the pin bearing against the semi-circular ribs 50 and 51, thereby pivotally securing the lower end of the hanger in the equalizer. The pin 52 preferably is somewhat shorter than the transverse dimensions of the equalizer so as to contact the outer wall of the equalizer opposite to opening 49 and terminate a short distance within the opening, the outer end whereof preferably is closed by a small disc which is welded in place thereby holding the pin against outward movement.

The semi-circular rib 48 provides a comparatively wide bearing for the lower end of the hanger or link 43; thus providing a substantial supporting means for sustaining or holding the hanger during normal operation of the truck at which time the trunnions 44, 44 of the hanger are out of seating relation with the socket providing ribs 46.

In view of the equalizer supported transom and the fact that it may have movement independent of the side frames, I provide the side frames 10 with brake hanger brackets as shown at 53 in Figures 2 and 3, so as to provide a positive relation between the bracket and brake head in keeping with the standard rules of practice. The sides of the equalizers, at the bottoms of the transom seating cavities, in view of the comparatively large hanger receiving openings 47, are preferably provided with drain holes, as shown at 54 in Figure 4.

With the equalizers provided with the enlarged openings 47 in their tops, the safety links 43 (previously having been mounted in the equalizers) during assembly of the truck may swing to the dotted line position shown in Figure 8 and thus permit the equalizers to be lifted sufficiently upward to permit the trunnion carrying ends of the safety links to pass over the tops of the arcuate or U-shape ribs 46, at which time the ends of the equalizers will be in position to be seated on the springs 14. During normal operation the trunnions 44 of the safety links will be floatingly disposed above the bottoms of the sockets formed by ribs 46, as shown in Figure 8; the vertical depth of the sockets being such that the equalizers may have maximum downward movement.

In order to afford suitable means for supporting suitable safety devices for the brake beams of the truck, I provide the depending extensions or brackets 22 of the transom with the inwardly disposed bracket portions 55, shown cast integral with the lower or roller seat portion of the brackets 22.

The bracket portions 55 are intended to receive suitable flat springs or bars (of any desired cross-sectional configuration) which preferably are removably secured in place and extend horizontally beneath the brake beams (not shown). The safety bars (not shown) may be used to maintain the brake beams in a position which will prevent the brake shoes dragging on the wheels, which might occur if the commonly used truss type of brake beam is used without means for supporting it in normal position; these bars or members constituting safety means for preventing the brake beams, in the event of a broken side brake beam hanger or other failure, falling on the rail.

My improved truck is especially designed for high speed, smooth and easy riding; a truck which is simple in construction and at the same time of moderate cost; which may be easily assembled without the use of bolts, rivets, or other extraneous fastening devices and which is of extremely low maintenance upkeep; with the principal members preferably constructed of cast steel; and while I believe the exemplification to be the simplest embodiment of my invention, structural modifications may be possible without, however, departing from the spirit of my invention as defined in the appended claims.

What I claim is:

1. In a truck, the combination of separate pedestalless side frames with integral journal boxes and inwardly disposed brackets provided with spring seats adjacent the bottoms of the journal boxes, said frames having central openings; equalizers arranged beneath said frames with their ends terminating above said brackets and supported by compression springs mounted on said brackets, the equalizers intermediate their ends being bowed downwardly and formed to provide substantially semi-circular seats; independent transom members disposed transversely between the side frames and united at their ends by extensions disposed through said frame openings and having semi-circular bottom surfaces adapted to seat on the semi-circular portions of the equalizers, said extensions involving inwardly disposed spring supporting brackets; a truck bolster arranged between the transom members intermediate the united ends; and compression springs seated on said transom brackets whereby the bolster is yieldingly supported.

2. In a truck, the combination of separate side frames with integral journal boxes at the ends and inwardly disposed brackets at the sides of the journal boxes; equalizers disposed beneath the side frames with upwardly extending ends terminating above said brackets, the intermediate portions of the equalizers bowing downwardly and formed to provide substantially semi-circular cavities; transom members cradled at the ends in said cavities and provided with side frame and equalizer overlapping portions whereby the side frames and the equalizers are operatively held in place and the side frames and equalizers at opposite sides of the truck are yieldingly secured to each other, the transom members adjacent their cradled ends having depending inwardly disposed brackets extending beneath the main portions of the transom members, said brackets having antifriction bearing holding and spring supporting seats; a truck bolster arranged intermediate the transom members and terminating short of the side frames; coiled springs arranged on said bracket seats for yieldingly supporting the ends of the bolster; and compression springs seated on said side frame brackets for yieldingly supporting the ends of the equalizers.

3. In a railway car truck, a pair of single piece side frames with integral journal boxes and spring supporting brackets adjacent the bottoms of the journal boxes disposed longitudinally toward the transverse median line of the truck; transom members disposed transversely of the truck with their ends united by downwardly disposed extensions having rounded bottoms, said extensions having laterally disposed portions arranged in interengaging relation with the side frames to maintain the spaced relation between the side frames and the transom members held in vertical non-tilting position the transom members adjacent their united ends having transversely disposed spring-seat providing brackets; equalizers at opposite sides of the truck with upwardly extending ends disposed above said spring supporting brackets of the side frames and supported by coil springs mounted on said brackets, the intermediate portion of each equalizer being bowed downwardly and formed to provide an arcuate cavity adapted to receive the rounded bottom of the respective transom extension to provide a fulcrum for the equalizer; and a truck bolster arranged between the transome members terminating short of the side frames and spring supported at its ends on said transom brackets.

4. In a railway car truck, loosely mounted transom members united at their ends and provided with laterally disposed brackets having concaved seats; anti-friction bearings arranged on said seats; cap members arranged on the bearings and adapted to move in a direction transversely of the truck; a plurality of nested coil springs arranged on said caps; a truck bolster arranged between the transom members with the bottom faces of its ends provided with spring-seats and mounted on said coil springs.

5. In a railroad car truck, a single piece side frame member on each side of the truck with journal box carrying ends and laterally disposed spring holding brackets integral with the journal box portions; an equalizer on each side of the truck with its ends resting on the springs carried by said brackets while the intermediate portion bows downwardly into a substantially semi-circular seat portion; a pair of transom members united at their ends by box-like extensions having substantially semi-circular bottoms seating in said seat portions of the equalizers, the ends of the transom members and inner sides of the extensions having laterally disposed spring holding brackets; a truck bolster disposed between the transom members intermediate their united ends and supported above said last mentioned brackets by compression springs mounted thereon, the ends of the bolster on the lower faces having spring receiving pockets; and safety links between the side frames and the equalizers pivotally connected to the latter and having free floating pivotal connections with the side frames.

6. In a railway car truck, single piece side frames with openings intermediate the ends and spring supporting brackets adjacent the ends; equalizers whose ends are disposed above said brackets and supported by springs on said brackets, the equalizers intermediate the ends bowing downwardly into substantially semi-circular cavities; parallelly arranged transom members united at the ends in extensions disposed through the frame openings, said extensions extending downwardly and having semi-circular bottoms to seat in the equalizer cavities and provide fulcrums for the equalizers, said transom extensions having interengaging relation with the equalizers and the side frames to prevent independent transverse movement of said elements, the transom members adjacent the lower portions of said extensions having horizontally disposed antifriction bearing and spring carrying brackets; a truck bolster arranged between the transom members with its ends disposed above said brackets and the bottoms of the ends provided with spring receiving pockets; and a plurality of coil springs and antifriction bearings arranged on said brackets for supporting the bolster and permitting lateral movement of the latter.

7. In a railway car truck, single piece hollow side frames provided interiorly with upwardly opening sockets arranged in laterally spaced complementary pairs; equalizers spring supported on the side frames; and pivotally mounted links between the frames and the equalizers, the upper ends of the links having laterally disposed trunnions seating in the complementary sockets while the lower ends of the links have removable pivot connections with the equalizers.

8. In a railway car truck, cast metal side frames of inverted U-shape cross-section, provided with spring supporting brackets adjacent the ends and interiorly intermediate the ends with socket forming ribs; coil springs mounted on said brackets; cast metal equalizers of hollow box-like formation provided in the upper walls with elongated slots and openings in the side walls, said side walls about the openings being provided with pin holding arcuate ribs; and safety links provided at their upper ends with trunnions floatingly arranged in said sockets within the side frames, while the lower ends of the links pass through the elongated slots in the equalizers and are pivotally secured by removable pins insertible through the side wall openings.

9. In a railway car truck, single piece side frames with laterally disposed spring supporting brackets adjacent their ends; coil springs mounted on said brackets; transom members united at their ends by box-like extensions disposed beneath the side frames, said extensions having substantially semicircular bottoms; single piece equalizers supported at their ends on said coil springs and bowing downwardly intermediate the ends into substantially semicircular seat forming portions to receive the semicircular bottoms of the transome end extensions to permit rocking movement of the equalizers thereabout; and safety links pivotally secured at their lower ends to the equalizers while the upper ends of the links have free floating pivotal relation with the side frames when the equalizers are in normal spring supported position.

10. In a railroad car truck, spring supported equalizers formed intermediate the ends to provide arcuate sockets; loosely mounted transom members united at their ends by extensions having arcuate bottoms seated in the arcuate sockets of the equalizers to permit the equalizers to rock about the transom extensions while the latter maintain their vertical positions, the transom members adjacent their united ends having depending inwardly disposed brackets with antifriction bearing and spring supporting seats provided with inwardly disposed brake beam safety means supporting extensions.

11. In a railroad car truck, spring supported equalizers; loosely mounted transom members united at their ends by extensions which seat on the equalizers and permit the latter to rock thereabout, the transom members adjacent the extensions having depending brackets terminating at bottom in horizontally disposed socketed antifriction element holding surfaces and inwardly disposed integral safety means supporting extensions; and spring supporting members arranged above the antifriction element holding surfaces of said brackets.

12. In a railway car truck, side frames with integral journal boxes at the ends and inwardly disposed brackets adjacent the sides of the journal boxes; coil springs mounted on said brackets; equalizers whose ends are supported by said springs and provided with openings in their tops; a loosely mounted transom whose ends are supported by the equalizers, the transom ends being formed to permit the equalizers to rock thereabout; means whereby the transoms are held against tilting movement; safety links pivotally secured in the equalizers and disposed through said openings therein, while the upper ends of the links have free floating pivotal connections with the side frames when the equalizers are in normal spring supported position.

13. In a railroad car truck, a single piece frame provided with vertically disposed U-shaped brackets open at the tops; a single piece equalizer; and safety links pivotally secured to the equalizer while the upper end has free floating pivotal connection with said brackets.

14. In a railway car truck, a frame member provided with upwardly opening sockets; a single piece equalizer member formed intermediate its ends with a transom supporting portion; and safety links provided at their upper ends with laterally disposed trunnions seataple in said frame sockets while the lower ends of the links have pivotal connection with said equalizer, the trunnioned ends of the links being free to move vertically during normal operative condition of the equalizer.

15. In a railway car truck, a pair of side frames each consisting of a single beam with downwardly disposed ends terminating in integral journal boxes having longitudinally extending spring holding brackets; a pair of equalizers, each having upwardly disposed ends adapted to be supported by the springs of said brackets; and vertically disposed safety links pivotally connected at their ends to the side frames and to the equalizers with the pivotal connection at one of the ends arranged to have free vertical movement when the equalizers are in normal spring supported position.

16. In a railway car truck, a pair of side frames each consisting of a single beam with downwardly disposed ends terminating in integral journal boxes with longitudinally disposed spring supporting brackets adjacent their bottom; a pair of equalizers with upwardly disposed ends resting on the springs carried by said brackets; transversely disposed transom members united at their ends in extensions disposed beneath said side frame beams and suported by the equalizers, said transom extensions being adapted to anchor the side frames and equalizers at opposite sides of the truck against independent transverse movement, the transom members at their united ends having inwardly disposed spring holding brackets; and a bolster arranged between the transom members with its ends supported by the springs of the transom brackets.

KARL M. HAMILTON.

REFERENCES CITED

The following references are of record in the file of this patent:

UNITED STATES PATENTS

| Number | Name | Date |
|---|---|---|
| 1,318,240 | Tatum | Oct. 7, 1919 |
| 2,009,770 | Goodwin | July 13, 1935 |
| 1,434,272 | Vaughan | Oct. 31, 1922 |
| 2,115,060 | Busse | Apr. 26, 1938 |
| 903,954 | Buck | Nov. 17, 1908 |
| 980,739 | Barber | Jan. 3, 1911 |
| 972,921 | Ritter | Oct. 18, 1910 |
| 994,501 | Buhoup | June 6, 1911 |
| 778,739 | Buhoup | Dec. 27, 1904 |
| 1,314,183 | Bubenheim | Aug. 26, 1919 |
| 1,858,473 | Taylor | May 17, 1932 |
| 1,997,662 | Suckfield | Apr. 16, 1935 |
| 1,120,690 | Clasen | Dec. 15, 1914 |
| 1,825,630 | Hamilton | Sept. 29, 1931 |
| 2,348,453 | Couch | May 9, 1944 |